United States Patent [19]
Rose

[11] Patent Number: 5,755,008
[45] Date of Patent: May 26, 1998

[54] BALL JOINT WHEEL ASSEMBLY

[75] Inventor: Mitchell Rose, South Euclid, Ohio

[73] Assignee: The Scott Fetzer Company, Westlake, Ohio

[21] Appl. No.: 770,140

[22] Filed: Dec. 19, 1996

[51] Int. Cl.⁶ .................................................. A47L 9/00
[52] U.S. Cl. ............................ 15/339; 15/327.1; 301/1
[58] Field of Search ............................ 15/339; 301/1, 301/5.1, 64.7

[56] References Cited

U.S. PATENT DOCUMENTS

| 1,976,068 | 10/1934 | Higbee ............................ 301/5.1 X |
| 3,608,236 | 9/1971 | Beny et al. ...................... 301/1 X |
| 3,720,449 | 3/1973 | Godin ............................. 301/64.7 X |

FOREIGN PATENT DOCUMENTS 63-203401  8/1988  Japan ........................ 301/5.1

*Primary Examiner*—Chris K. Moore
*Attorney, Agent, or Firm*—Jones, Day, Reavis & Pogue

[57] ABSTRACT

A ball joint wheel assembly is disclosed which includes an axle with at least one ball end, to which a wheel is secured. The wheel includes a socket for retaining the ball end, thereby forming a ball joint for supporting the rotation of the wheel. A bore is connected to the socket for receiving the axle and defining a bore wall within the wheel. The bore is substantially conical and has a desired bore angle. The bore wall thereby defines and limits the swivel angle of the wheel.

21 Claims, 3 Drawing Sheets

5,755,008

BALL JOINT WHEEL ASSEMBLY

BACKGROUND OF THE INVENTION

The present invention is directed to the field of swivel wheels, particularly of the type used for vacuum cleaners and other appliances. In a conventional design, a typical upright vacuum cleaner has two front wheels. FIGS. 1A and 1B show a common support assembly 10 for supporting and adjusting the nozzle height of an upright vacuum cleaner. The base of a typical upright vacuum cleaner (shown in phantom) has a support assembly 10 comprising a wheel assembly that is raised and lowered by cranking the lever arm 16 around the pivot rod 18. The wheel 12 is mounted on, and rotates around, a horizontal axle 14 facing straight sideways.

The conventional cylindrical wheels 12 have only one rotational degree of freedom and thus only permit easy movement of the vacuum in forward and backward directions. Extra effort is required to turn the vacuum, which may be difficult for elderly or disabled users. Maneuverability could be improved by substituting the cylindrical wheels 12 with a swiveling wheel, i.e. a caster. However, in order to properly bear a load, a caster kingpin must be oriented vertically. Casters therefore cannot be attached to a conventional crank mechanism, which would tilt the kingpin. Thus, nozzle height for a caster-mounted vacuum cleaner could not be adjusted as required for standard use. Also, when moved, asters rotate to follow the stroke direction. When the stroke direction is reversed, e.g. from forward to backward, the caster swivels 180 degrees, causing the front end of the vacuum cleaner to swerve at the beginning of each stroke. In a familiar example, caster-type wheels cause the front end of a shopping cart to swerve when reversing from forward to backward. Thus, casters would also make it difficult to control the vacuum cleaner.

SUMMARY OF THE INVENTION

In view of the difficulties and drawbacks associated with previous wheel assemblies, it would be advantageous to provide a wheel assembly which solves the previous problems.

Therefore, there is a need for a wheel assembly that swivels to follow the direction of a stroke.

There is also a need for a swiveling wheel assembly which can be used with a height-adjusting mechanism.

There is also a need for a swiveling wheel assembly which does not swerve during direction reversals.

There is also a need for a swiveling wheel that tilts to accommodate uneven surfaces.

These needs and others are satisfied by the ball joint wheel assembly of the present invention which includes an axle with at least one ball end, to which a wheel is secured. The wheel includes a socket for retaining the ball end, thereby forming a ball joint for supporting the rotation of the wheel. A bore, extending from the wheel periphery to the socket, receives the axle and is bounded by a bore wall within the wheel. The bore is preferably (but not limited to) substantially conical in shape and has a desired bore angle. The bore wall thereby defines and limits the swivel angle of the wheel.

As will be appreciated, the invention is capable of other and different embodiments, and its several details are capable of modifications in various respect, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear the reference numerals and wherein.

DETAILED DESCRIPTION OF THE INVENTION

Figure 1A:
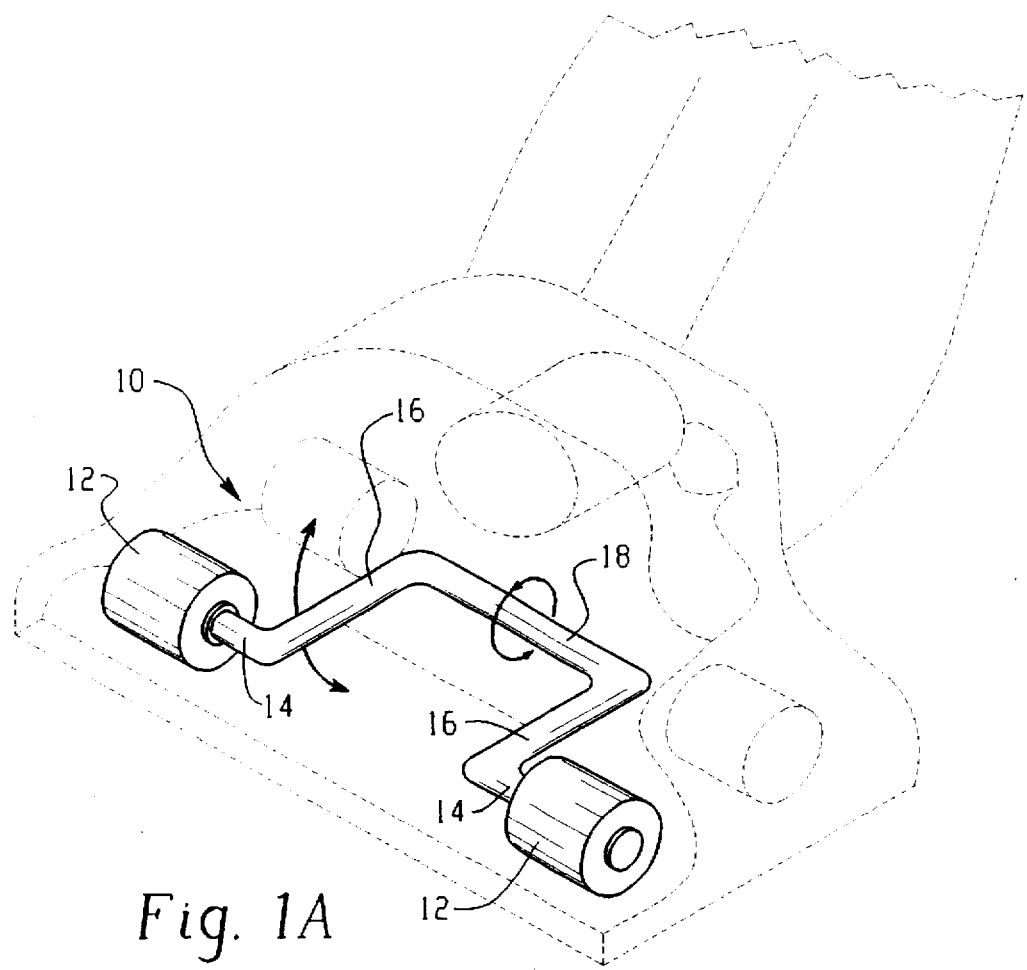
FIGS. 1A and 1B show a conventional wheel assembly as used with a vacuum cleaner configuration.
Figure 1B:
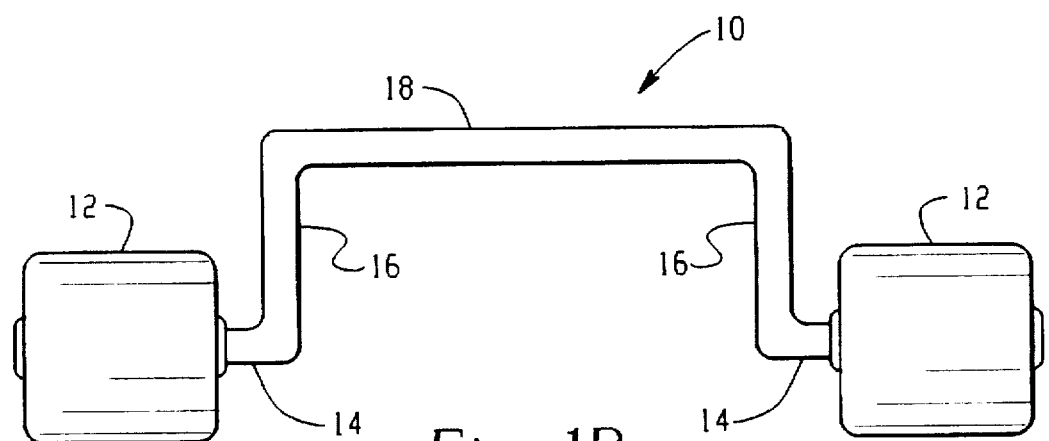
Figure 2:
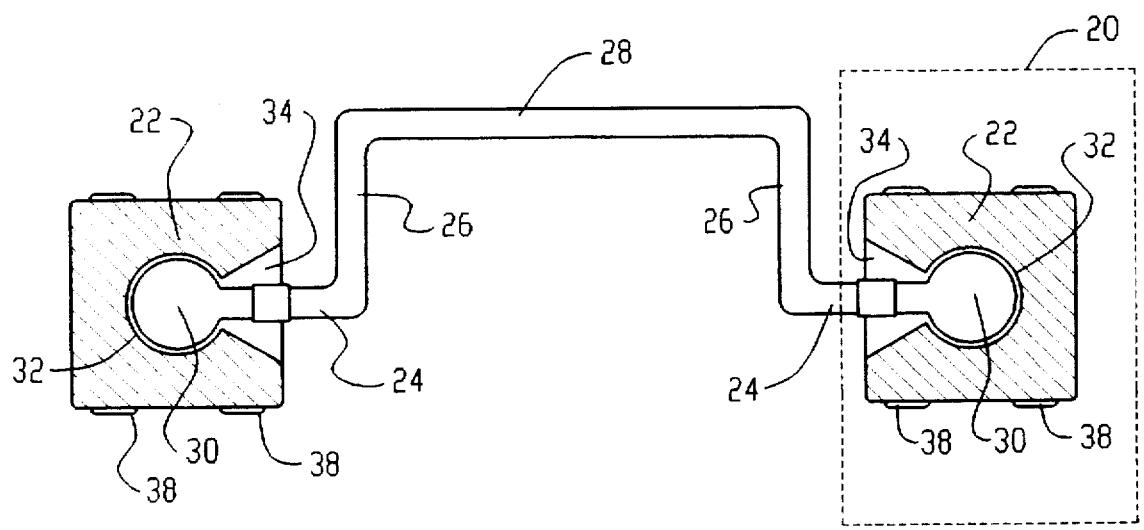
FIG. 2 is an overhead sectional view showing a wheel assembly according to the present invention.

The drawings now referred to are for purposes of illustrating the preferred embodiments of the invention and are not for purposes of limiting the same. FIG. 2 shows the support assembly, including the wheel assembly 20 according to the present invention. In the preferred embodiment, the wheel assembly 20 is used with the cranking assembly of e.g. a vacuum cleaner. The wheel assembly is raised and lowered by cranking a lever arm 26 around a pivot rod 28, to adjust the height of the vacuum cleaner nozzle or other body to be supported. However, the present wheel assembly 20 can be used in other wheel applications without departing from the invention.

Figure 3A:
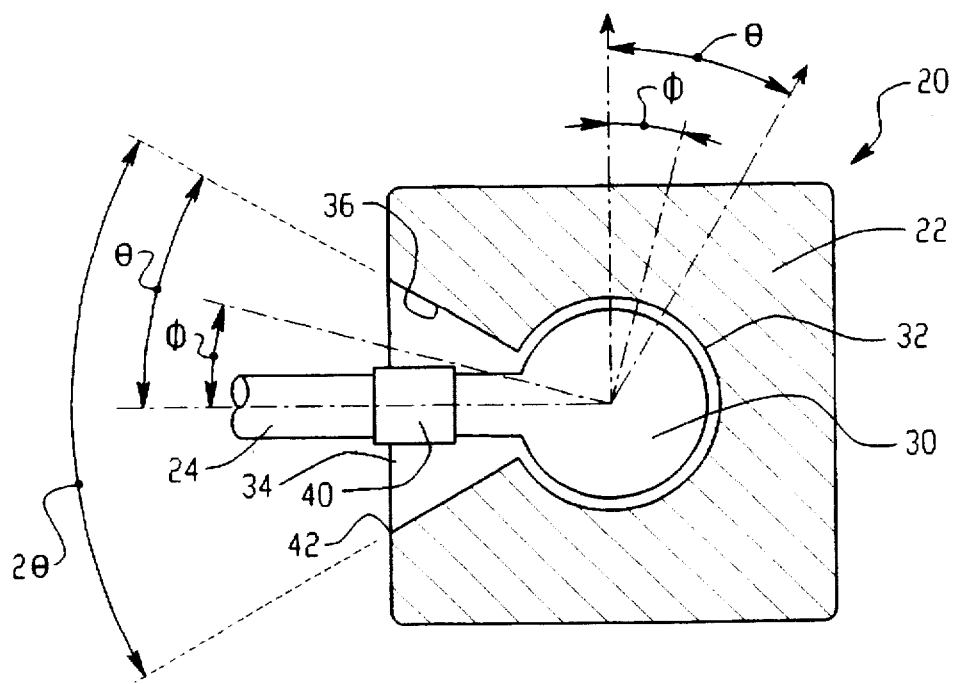
FIGS. 3A and 3B are side-sectional and oblique-sectional views showing the wheel assembly and operation according to a first embodiment of the present invention.
Figure 3B:
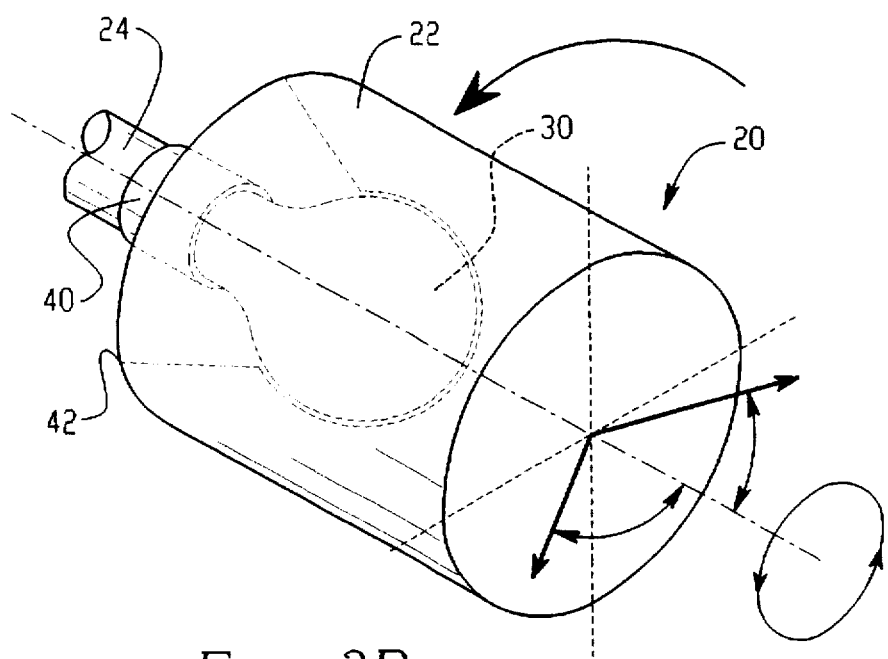

FIG. 2 shows the wheel assembly 20 according to a first embodiment of the invention. Wheel assembly 20 has a cylindrical wheel 22 which rotates around the axle 24. The axle 24 includes a ball 30 at its one end, and is affixed to a lever arm 26 at its other end. The wheel 22 has a socket 32, preferably substantially concentric to its geometric center, which surrounds and retains the ball 30. As seen in FIGS. 3A and 3B, the ball 30 and the socket 32 form a ball joint. The wheel 22 has several degrees of motion about the ball joint. For example, the wheel 22 can rotate (to move translationally along the floor), swivel (turn in the horizontal plane), and camber (tip sideways).

The axle 24 extends into the wheel 22 and to the socket 32 via the bore 34. The bore 34 is preferably divergent from the socket, preferably conical in shape, but can be polyhedral or any other shape which permits the aforementioned degrees of motion. The intersection between the bore 34 and the socket 32 thus preferably defines a circular opening that is smaller than the ball 30. Hence, inserting the ball 30 into the socket 32 can preferably be done by assembling two halves of the wheel 22 together around the ball 30. Alternatively, pre-formed ball joints can be used, such as are commercially available, comprising a bored ball rotatably held within a ring-shaped socket. Such a ball joint can be simply fixed at the center of wheel 22 and an axle 24 attached to the ball.

The bore 34 is shown in the figures as substantially conical with a bore wall 36 forming an angle e relative to the axle's axis. If swiveled far enough, either the bore wall 36 or the mouth of socket 32 would scrape the axle 24, causing damage and preventing rotation. A slip ring 40 is provided to prevent this by providing a slippery buffer between the bore wall 36 and axle 24. The slip ring 40 can be a roller bearing or a sleeve of a low friction material, such as Nylons™.

The wheel cannot swivel past the point at which the bore wall 36 hits the slip ring 40. Hence, the angular range of swivel φ is a little less than the angle Θ of the bore wall 36. Angle Θ is preferably as large as practicable so as to maximize range of swivel, with the limitation that he bore mouth 42 be smaller than the wheel's circumference. Angle e is therefore preferably 40–60 degrees.

The ball 30 is preferably 0.2–1.0 inches in diameter. The socket 32 is preferably substantially the same size as the ball 30 so as to maximize load-supporting contact, while being loose enough to avoid friction.

The wheel 22 is formed of a rigid or semi-rigid material, such as rigid or semi-rigid PVC. The wheel is preferably 1–4 inches in diameter and 2–5 inches long. To avoid wobbling, wheel length should be greater than wheel diameter. The surface can include an O-ring 38 or be coated with a high-friction material such as rubber for use on hard floors, to increase traction and reduce scuffing.

Axles in previous wheel types must be horizontal and oriented sideways. In contrast, the axle 24 in the present invention need not be horizontal nor oriented sideways. In operation, when the vacuum cleaner is pushed or pulled, the wheel rotates around the ball joint, just as a previous wheel rotates around its axle. When the vacuum cleaner is pushed or pulled along an arcuate path, the wheel swivels to face, and rotate in, the direction being pushed or pulled. The principle of operation is that one wheel corner digs slightly into the carpet and swivels the wheel around until the wheel axle is perpendicular to the stroke direction.

The stroke angle is defined as the angle the vacuum cleaner is pushed, with 0 degrees being straight forward and 90 degrees being sharply sideways. When the stroke angle changes 180 degrees, say from forward to backward, the direction of wheel rotation reverses without swiveling or swerving the cleaner. When traveling over uneven floors, the wheel 24 cambers, to match the floor contour. When the support assembly is cranked up or down, wheel operation is unaffected.

This embodiment has many benefits over conventional wheels, including: swiveling to match stroke direction and accommodating uneven floors.

Other benefits, such as those over conventional casters are: not swerving when reversing direction, accommodating uneven floors, and enabling cranking-type height adjust.

Figure 4:
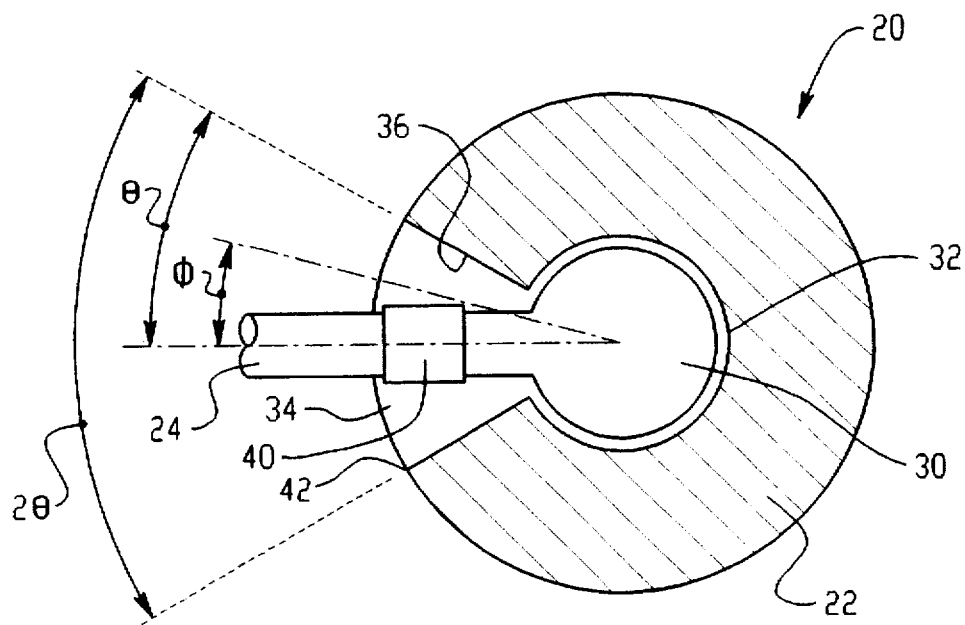
FIG. 4 is a side-sectional view showing the wheel assembly according to a second embodiment of the present invention.

FIG. 4 illustrates an alternative second embodiment of wheel assembly 20, which works well on both carpet and hard floors. It is structurally the same as the embodiment of FIGS. 2, 3A and 3B, except that the wheel 22 is spherical. As in the first embodiment, it has an axle 24 attached to a ball 30 held in a socket 32 at the center of a spherical wheel 22. The axle 24 extends into the wheel 22 via a bore 34 which extends from the socket 32 to the bore mouth 42. The bore 34 is also preferably, but not limited to, a conical shape. Its intersection with the socket 32 preferably defines a circular opening that is smaller than ball 30. In FIG. 4, the bore 34 is fairly conical, having a bore wall 36 slanted at an angle Θ relative to the axle axis. A slip ring 40 provides a slippery buffer between the bore wall 36 and axle 24.

However, this second embodiment has a different principle of operation than the first embodiment. Operation does not depend on the wheel 22 swiveling to match the stroke direction, as does the first embodiment. Wheel 22 is free to turn in any direction, limited only by angle φ, which is somewhat less than bore angle Θ.

Angle Θ is preferably as large as practicable in order to maximize the range of swivel, with the limitation that the mouth 42 not be so wide as to touch the carpet when swung down. Angle Θ for this embodiment is therefore preferentially 45–60 degrees.

The wheel 22 is formed of a rigid or semi-rigid material, such as PVC. The wheel 22 is preferably 1–4 inches in diameter.

Axles in previous wheel types must be horizontal and oriented sideways. In contrast, the axle 24 in the current invention need not be horizontal nor oriented sideways.

In operation, the spherical wheel's motion depends on stroke angle. In stroke angles of roughly 0–45 degrees, the wheel 22 rotates in the stroke direction, with no friction between wheel and floor. In stroke angles of roughly 45–70 degrees, the wheel 22 rotates almost in the stroke direction, leaving some friction between wheel 22 and floor, but not as much as with wheels such as had been known previously. In stroke angles of roughly 70–90 degrees, the wheel cannot rotate, and its spherical surface glides smoothly over the carpet. This is better than previous types of wheels, whose round edges dig into the carpet at sharp stroke angles.

Like a caster, this embodiment can rotate to match the stroke angle, which previous wheel types cannot do. This embodiment also includes benefits over conventional casters, including not swerving when reversing direction and enabling cranking-type height adjustment.

As described hereinabove, the present invention solves many problems associated with previous wheel assemblies, and presents improved efficiency and operability. However, it will be appreciated that various changes in the details, materials and arrangements of parts which have been herein described and illustrated in order to explain the nature of the invention may be made by those skilled in the art within the principle and scope of the invention as expressed in the appended claims.

I claim:

1. A wheel assembly comprising:
    an axle having at least one end with a ball secured thereto;
    a pivoting lever arrangement, affixed to the axle, for varying the position of the wheel assembly, so as to adjust the height of a body to be supported;
    at least one wheel secured to the axle and comprising:
    a socket, formed therein, for respectively retaining the ball, thereby forming a ball joint, wherein the wheel rotates about the ball joint;
    a bore, extending from the socket, for receiving the axle, and defining a bore wall within the wheel.

2. The wheel assembly of claim 1 wherein the axle includes a slip ring, on an axle portion within the bore, to preclude contact between the axle and the bore wall.

3. The wheel assembly of claim 1 wherein the wheel is cylindrical in shape.

4. The wheel assembly of claim 3 wherein the wheel's length is greater than its diameter.

5. The wheel assembly of claim 1 wherein the wheel is spherical in shape.

6. The wheel assembly of claim 1 wherein the bore is substantially conical and has a predetermined bore angle, wherein the bore angle defines a swivel angle limit of the wheel.

7. The wheel assembly of claim 6 wherein the bore angle is between 40 and 60 degrees.

8. The wheel assembly of claim 1 wherein the socket is substantially concentric with the wheel's geometric center.

9. The wheel assembly of claim 1 wherein the exterior of the wheel includes at least one O-ring.

10. The wheel assembly of claim 1 wherein the exterior of the wheel includes a rubber coating.

11. A vacuum cleaner comprising:

a nozzle for receiving dirt drawn in by an airflow;

a filter bag for receiving and retaining the dirt removed by the airflow from the nozzle;

means for producing the airflow;

a mobile nozzle support including a wheel assembly comprising:

an axle having at least one end with a ball secured thereto;

at least one wheel secured to the axle and comprising:

a socket, formed therein for respectively retaining the ball, thereby forming a ball joint, wherein the wheel rotates about the ball joint;

a bore, extending from the socket, for receiving the axle, and defining a bore wall within the wheel.

12. The vacuum cleaner of claim 11 wherein the mobile nozzle support further comprises a pivotal lever arrangement, affixed to the axle, for varying the position of the wheel assembly, so as to adjust the height of the nozzle above a surface to be vacuumed.

13. The vacuum cleaner of claim 11 wherein the axle includes a slip ring on an axle portion within the bore, to preclude contact between the axle and the bore wall.

14. The vacuum cleaner of claim 11 wherein the wheel is cylindrical in shape.

15. The wheel assembly of claim 14 wherein the wheel's length is greater than its diameter.

16. The vacuum cleaner of claim 11 wherein the wheel is spherical in shape.

17. The vacuum cleaner of claim 11 wherein said bore is substantially conical and has a predetermined bore angle, wherein the bore wall defines a swivel angle of the wheel.

18. The vacuum cleaner of claim 17 wherein the bore angle is between 40 and 60 degrees.

19. The wheel assembly of claim 11 wherein the socket is substantially concentric with the wheel's geometric center.

20. The vacuum cleaner of claim 11 wherein the exterior of the wheel includes at least one 0-ring.

21. The vacuum cleaner of claim 11 wherein the exterior of the wheel includes a rubber coating.

* * * * *